United States Patent
Fagridas

(10) Patent No.: US 8,185,117 B2
(45) Date of Patent: May 22, 2012

(54) FAST HANDOVER IN MOBILE COMMUNICATIONS NETWORKS

(75) Inventor: Nikolaos Fagridas, Athens (GR)

(73) Assignee: Panasonic Corporation, Osaka (JP)

( * ) Notice: Subject to any disclaimer, the term of this patent is extended or adjusted under 35 U.S.C. 154(b) by 629 days.

(21) Appl. No.: 10/548,912

(22) PCT Filed: Mar. 5, 2004
(Under 37 CFR 1.47)

(86) PCT No.: PCT/IB2004/001248
§ 371 (c)(1),
(2), (4) Date: Apr. 16, 2007

(87) PCT Pub. No.: WO2004/082299
PCT Pub. Date: Sep. 23, 2004

(65) Prior Publication Data
US 2007/0297364 A1    Dec. 27, 2007

(30) Foreign Application Priority Data
Mar. 14, 2003  (GB) .................................. 0305925.0

(51) Int. Cl.
*H04W 36/00*  (2009.01)

(52) U.S. Cl. ........ 455/439; 455/436; 455/437; 455/438; 455/440; 455/442; 370/329; 370/330; 370/331

(58) Field of Classification Search ....... 455/432.1–453; 370/331–349
See application file for complete search history.

(56) References Cited

U.S. PATENT DOCUMENTS

| | | | |
|---|---|---|---|
| 6,907,501 B2 * | 6/2005 | Tariq et al. | 711/118 |
| 7,379,433 B1 * | 5/2008 | Patel et al. | 370/312 |
| 2001/0046223 A1 * | 11/2001 | Malki et al. | 370/338 |
| 2003/0073452 A1 * | 4/2003 | Omae et al. | 455/466 |
| 2003/0104814 A1 * | 6/2003 | Gwon et al. | 455/436 |
| 2003/0224774 A1 * | 12/2003 | Cheng et al. | 455/422.1 |
| 2003/0225892 A1 * | 12/2003 | Takusagawa et al. | 709/227 |
| 2004/0085957 A1 * | 5/2004 | Verma | 370/389 |
| 2004/0090937 A1 * | 5/2004 | Chaskar et al. | 370/331 |
| 2004/0114558 A1 * | 6/2004 | Krishnamurthi et al. | 370/338 |
| 2004/0137902 A1 * | 7/2004 | Chaskar et al. | 455/436 |

FOREIGN PATENT DOCUMENTS

| | | |
|---|---|---|
| EP | 1199841 | 4/2002 |
| JP | 9-252321 | 9/1997 |
| JP | 2001-128212 | 5/2001 |
| JP | 2003-060685 | 2/2003 |

OTHER PUBLICATIONS

C. Perkins, Ed., IP Mobility Support for IPV4, Nokia Research Center, Aug. 2002, pp. 1-16 and 61-72.
Japanese Office Action together with translation dated Aug. 18, 2009.

\* cited by examiner

*Primary Examiner* — Lester Kincaid
*Assistant Examiner* — Mehmood B Khan
(74) *Attorney, Agent, or Firm* — RatnerPrestia

(57) ABSTRACT

A method is described for routing of data in hierarchical mobility management systems with tiered mobile anchor points. Routing of data is switched from old to new communications nodes and regulated, by a controlling mobile anchor point having both communications nodes in its domain, to occur synchronously with the expiry of a determined period following its receipt of a handover initiation signal. The main determinant of the period is the remaining time of attachment of the old communications node.

19 Claims, 8 Drawing Sheets

STEP1:

STEP2:

STEP3:

STEP4a

STEP4b

STEP4c

STEP5

STEP6

FAST HANDOVER IN MOBILE COMMUNICATIONS NETWORKS

This invention relates to mobile communications, and in particular the handing over of a mobile node from one static communications node to another whilst the mobile node is receiving data, especially packet data.

BACKGROUND

FIG. 1 shows a standard configuration for enabling mobile communications between a Mobile Node MN, such as a portable telephone, and a corresponding node, not shown, via the Internet I. The Mobile Node MN is wirelessly connected to the network via the Access Points, AP1, AP2, AP3 etc and the Access Routers AR1, AR2 are connected to the Internet via a Router R.

Initially, with the Mobile Node MN in the position shown, signals are exchanged between the Mobile Node MN and the Internet via access point AP2, Access Router AR1 and Router R. When the Mobile Node is to be handed over from Access Point 2 to Access Point 3, for example because it is travelling from one towards the other, handover initiation and handover acknowledgement messages are exchanged between Access Routers AR1 and AR2. The message sent from the new Access Router AR2 to the old Access Router AR1 will include a new care of address (nCoA) to be used by the Mobile Node once it is under the control of Access Router AR2. This new address is then communicated back to the Mobile Node MN. At a specified time after this event, data packets intended for the Mobile Node MN are no longer sent from AR1 to AP2 but are instead "tunnelled" from AR1 to AR2 in preparation for the Mobile Node MN being handed over from AP2 to AP3. At this point it is necessary for packets to be buffered in AR2 pending handover of the MN from AP2 to AP3 i.e. layer 2 (L2) handover. Once layer 2 handover has been completed, signals are exchanged between the MN and the AR2 via the AP3 so that packets can be directed from AR2 to AP3 and then the MN. Finally, a binding update message BU is sent from the MN to the Router R. At this point the router knows that the MN is in communication with AR2 so that it can send packets direct to AR2 without tunnelling from AR1 to AR2.

In the above example, there is a single Router R dealing with all handover requests. This Router needs to store and keep updated the care of addresses used by the Mobile Nodes as they move from place to place. In practice, having only one Router R would require too much processing time to manage a large number of Mobile Nodes (MNs).

More recently, so-called "mobile anchor points" have been proposed. These are discussed in many documents including U.S. patent publication US 2001/0046223A1 (described here as mobility agents). A mobility agent or mobile anchor point can perform the functions of a home agent including maintaining a list which provides a mapping between a home address of a Mobile Node and its corresponding current care of address. Mobile anchor points may be included at different levels of the network hierarchy (tiered mobile anchor points) and this can reduce signalling delay when a Mobile Node changes point of attachment to the network.

SUMMARY OF THE INVENTION

The aim of the present invention is to provide fast handover procedures by exploiting the benefits from using concepts related to standard:

i) hierarchical handover procedures, such as the adoption of one or more extra degrees of localisation between an Access Router and the top Mobile Anchor Point (MAP) in the MAP hierarchy.
ii) anticipated handover procedures The invention provides a method for routing of data in hierarchical mobility management systems with tiered mobile anchor points in which routing of data is switched from old to new communications nodes and regulated, by a controlling mobile anchor point having both communications nodes in its domain, to occur synchronously with the expiry of a determined period following its receipt of a handover initiation signal, where the determinant of the period is the remaining time of attachment of the old communications node.

The invention may be applied to real-time multi-media applications in packet networks. Effective routing of data packets and fast handover mechanisms reduce potential handover delays and loss of data at the receiver It will be appreciated from the foregoing that there is no tunnelling between Access Routers in the method of the invention. Because of the extra degree of localisation achieved by the MAP hierarchy, it is practical in terms of time to redirect packets via a new route involving one or more MAPs once a MAP having the old and new communications nodes in its domain knows the new care of address to be used by the Mobile Node.

The process involves what might be called a "partial anticipated handover" in that packets are directed to the new point of attachment in readiness and (prior to) the arrival of the Mobile Node.

Preferably, the new care of address does not have to be reported at every level in the MAP hierarchy, but only as far as the lowest level MAP having both old and new communications nodes (Access Routers) in its domain.

As will be explained in more detail below, in the preferred implementation of this invention, for the purpose of synchronisation, messages are exchanged between the old and new communications nodes that effectively define the duration of the handover, and from this other components of the system will derive timing signals.

BRIEF DESCRIPTION OF THE DRAWINGS

An embodiment of the invention will now be described by way of example only and with reference to the accompanying drawings in which.

DETAILED DESCRIPTION

As noted above, the configuration of the presented proposal is based on the principle that in a MIPv6 (Mobile Internet Protocol version 6) compatible system, a number of mobility agents or mobile anchor points can be included on different levels of the network hierarchy. A suitable configuration is shown in FIG. 2.

Figure 1:
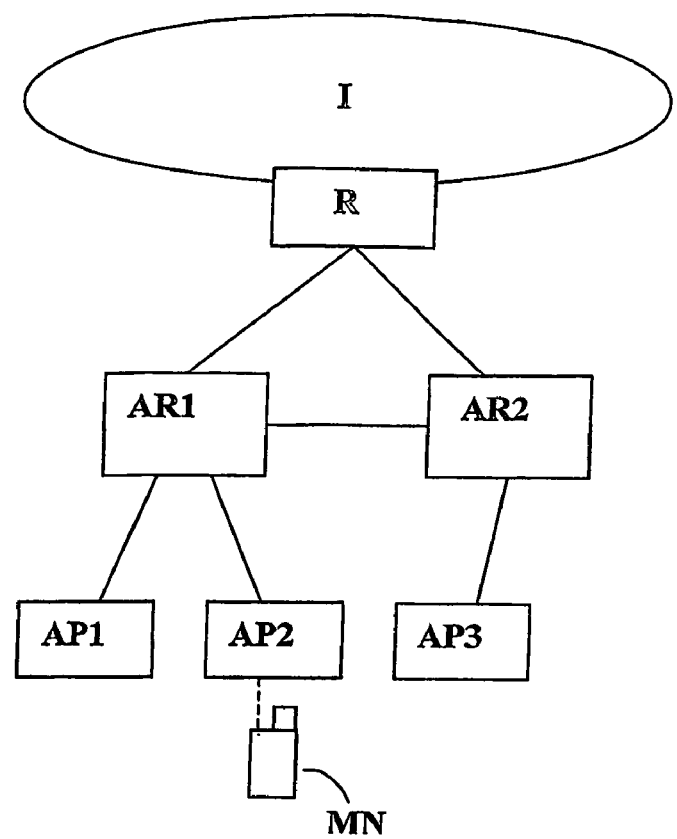
FIG. 1 is a schematic diagram showing a Mobile Node moving between access points for the purpose of describing known handover procedures (above)
Figure 2:
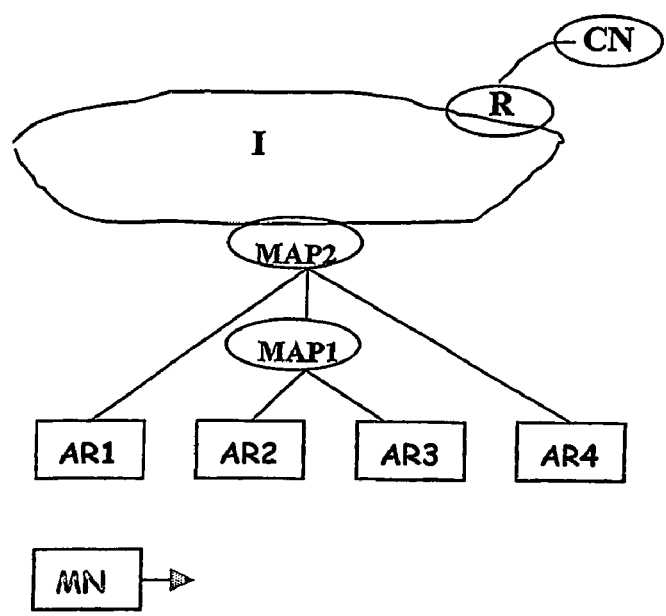
FIG. 2 illustrates a possible topology configuration using mobile anchor points.

In FIG. 2, a Corresponding Node CN (fixed or mobile) is communicating with Mobile Node MN. The media path between CN and MN is via Router R associated with the corresponding node, the Internet, a hierarchical structure of mobile anchor points MAP, a layer of points of attachment or Access Routers AR1, AR2, AR3, AR4 and a number of Access Points geographically coincident with the Access Routers that are not shown. When a Mobile Node enters a domain, such as the domain controlled by MAP2, it will register with each mobility agent between it and the Internet using a different localised care of address. When a packet is sent to the Mobile Node from a corresponding node, the packet arrives at the top level mobility agent. The top level mobility agent will encapsulate the packet and the next mobility agent—below it in the hierarchy—will decapsulate that packet and encapsulate it again prior to passing it down to the next mobility agent in the hierarchy. The process goes on in a similar fashion until the Mobile Node MN receives the data packet.

Figure 3:
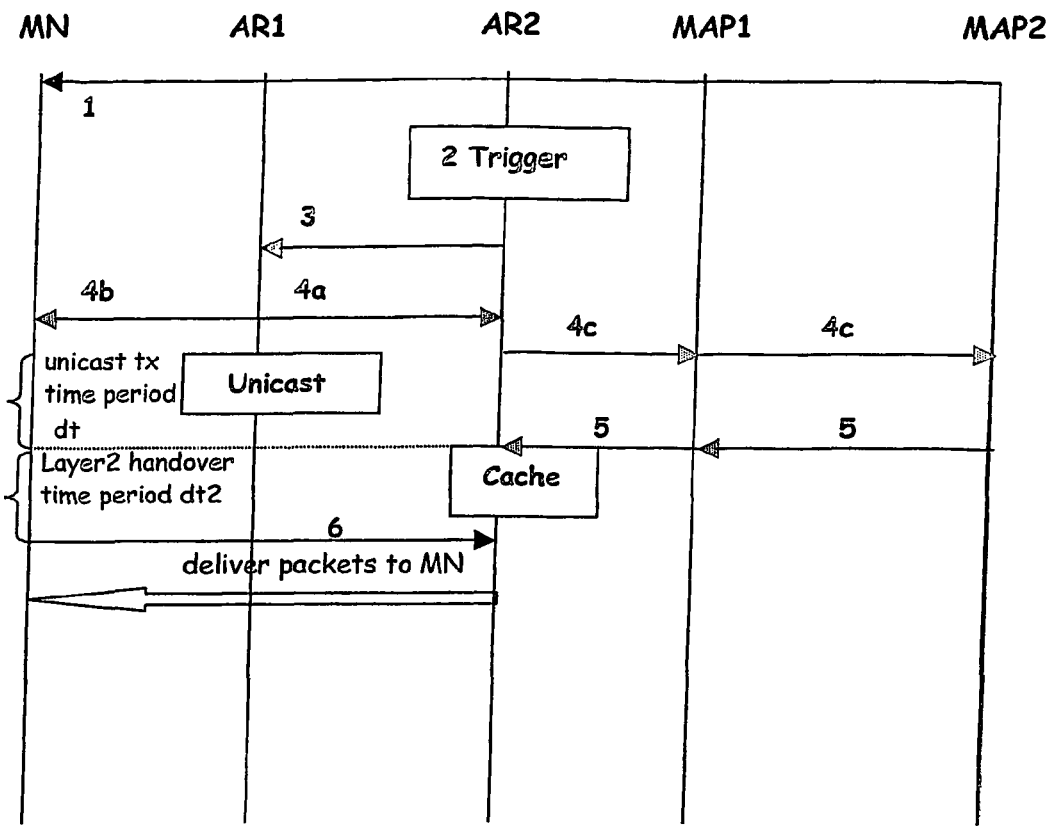
FIG. 3 illustrates the timing of signals exchanged between a Mobile Node and higher layers in the topology in a handover method according to the invention.

The process of handing over the MN from AR1 to AR2 occurs in a number of distinct steps whose timing is shown in FIG. 3. Each step is now described in detail.

Step 1

Figure 4:
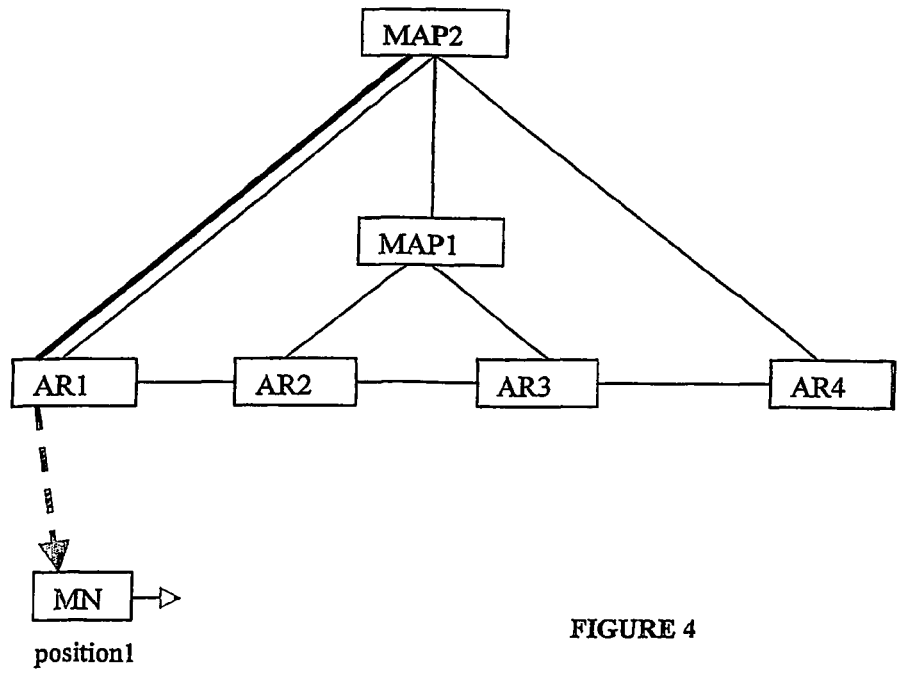
FIGS. 4, 5, 6, 7, 8, 9, 10, 11, 12, 13, 14 and 15 are block diagrams that illustrate the successive steps in a handover method according to the invention.

Referring now to FIG. 4, Mobile Node MN is moving away from AR1 towards AR2. Initially, data packets flow from MAP2 to MN via AR1.

Step 2

Figure 5:
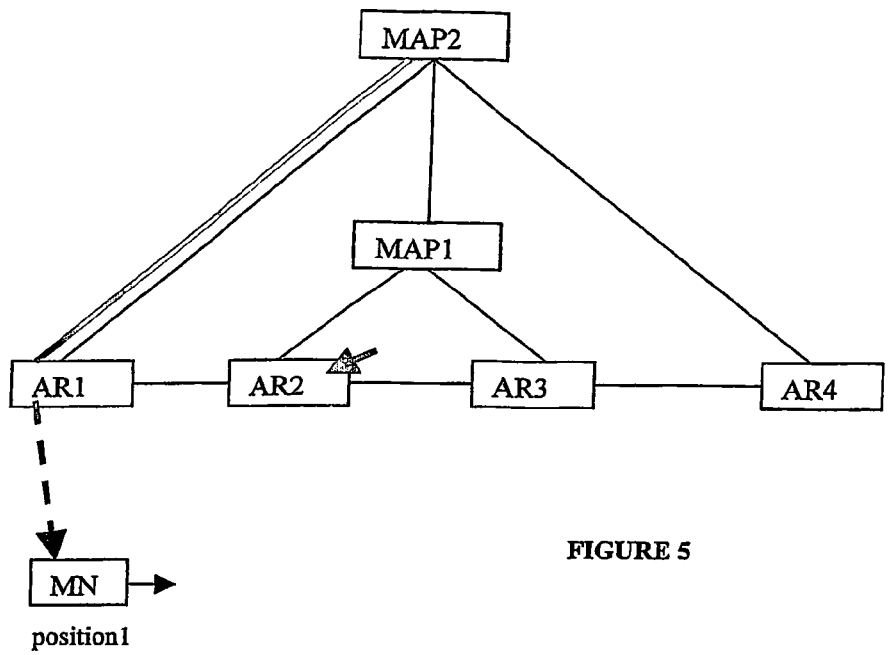
Figure 6:
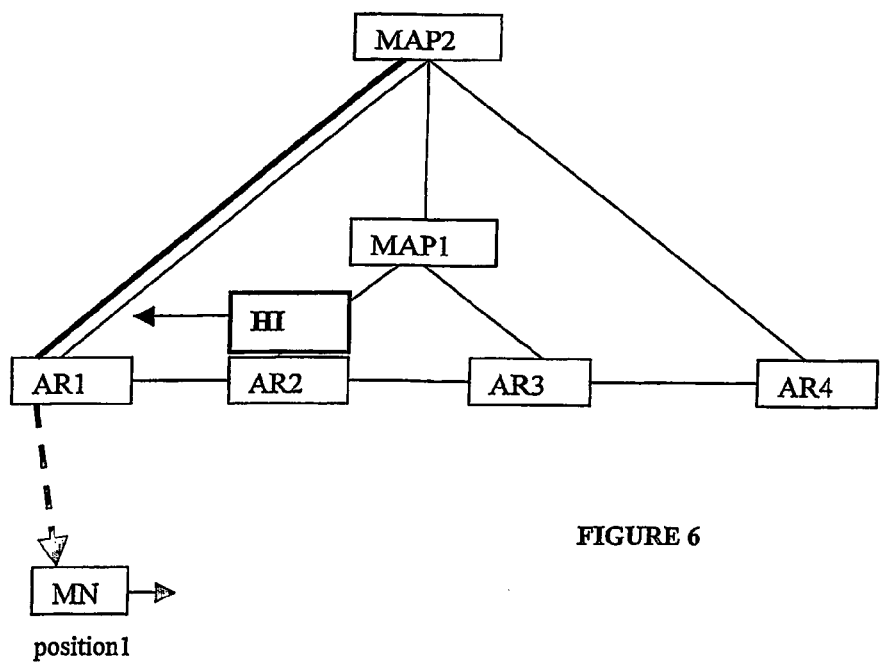
Figure 7:
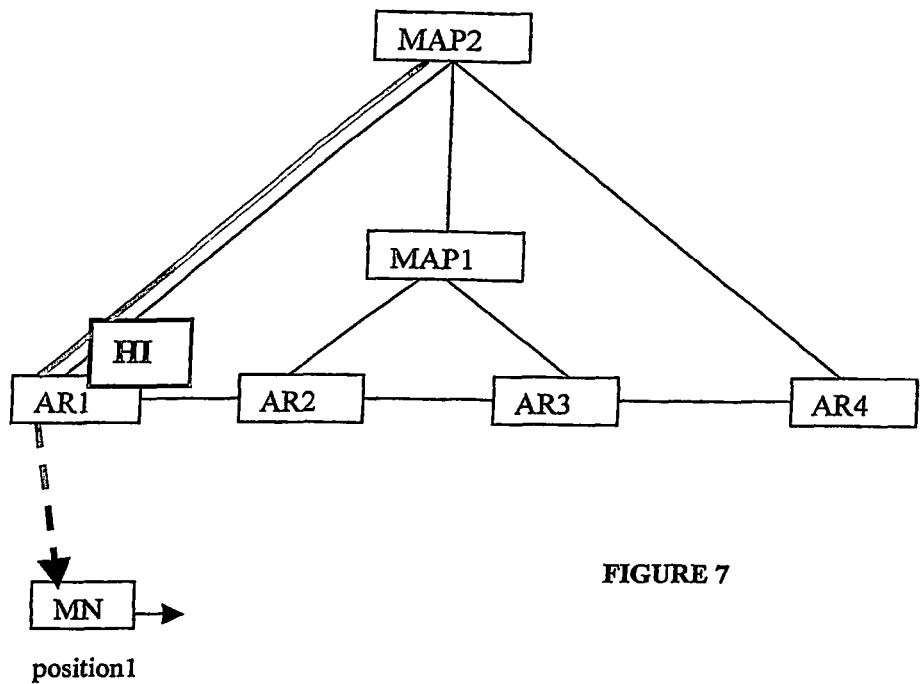
Figure 8:
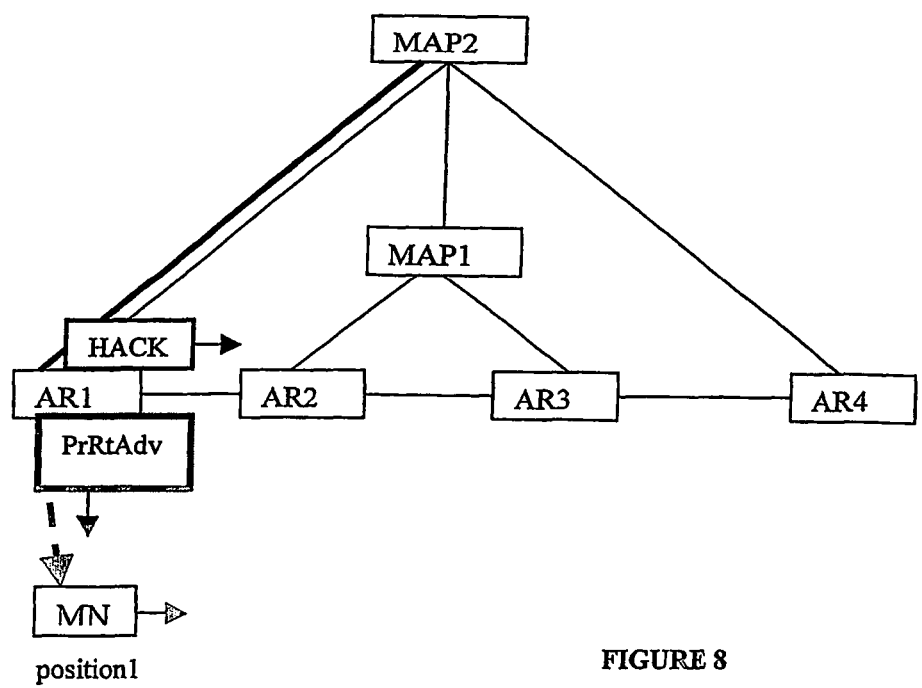

As with the prior method described above, a handover is triggered (in a manner which does not form part of this invention) following which handover initiation HI and handover acknowledgement HACK signals are exchanged between current Access Router AR1 and the new Access Router AR2 to which the MN is about to be handed over. The message passed back to AR1 will include a care of address associated with AR2 to be used by MN once it has been handed over. In this particular example, AR2 is triggered (see FIG. 5) to send a handover initiation HI message to AR1 (see FIG. 6), which includes the new care of address. FIG. 7 shows the HI signal arriving at AR1.

Step 3

The HI signal contains:
1. The IP address of AR2.
2. The potential CoA to be used by MN.
3. An indication of the amount of time AR1 needs to continue to unicast the MN Items 1 and 2 are standard procedure but item 3 is important to the preferred embodiment of the present invention as will be described below.

Step 4a

Figure 9:
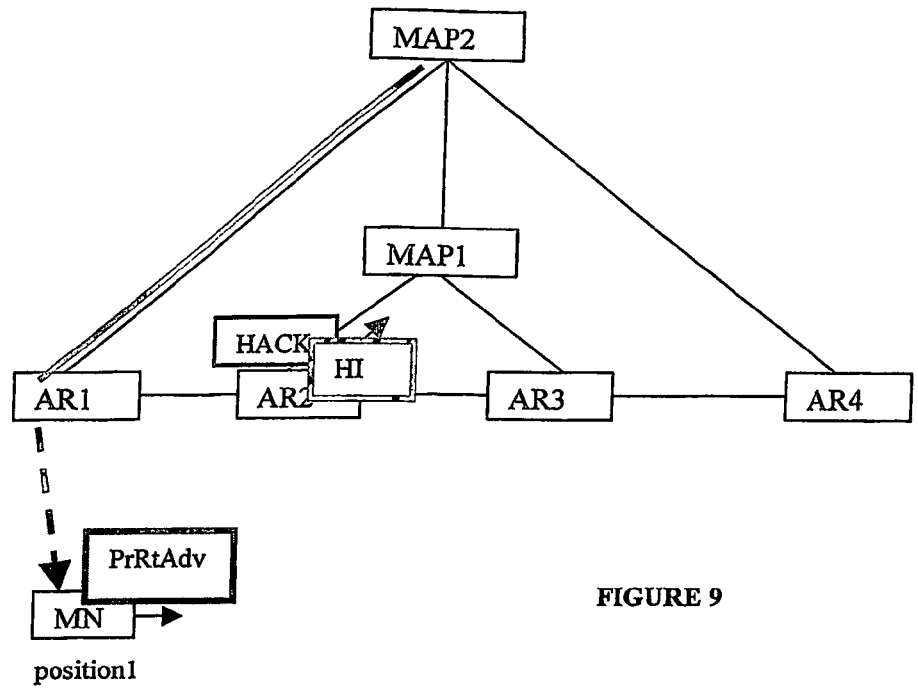

When the AR1 receives the HI message it must reply with a Handover Acknowledgement message (HACK). The HACK message contains:
1. The MN's home address
2. The MN's old Care of Address
3. The MN's link layer address
4. The amount of time (dt) the AR1 is willing to continue unicasting the MN Step 4b At the same time, as shown in FIG. 9, AR1 sends a Proxy Router Advertisement (PrRtAdv) to the MN. The PrRtAdv message contains:
1. The IP address of AR2 (the new Access Router)
2. The Care of Address proposed by AR2 (the new Access Router).

FIG. 9 shows the Proxy Router Advertisement message reaching the MN and the handover acknowledgement message HACK-reaching AR2. FIG. 9 also shows the Handover Initiation transmission from AR2 to MAP1 once the HACK message has reached AR2

Step 4c

Figure 10:
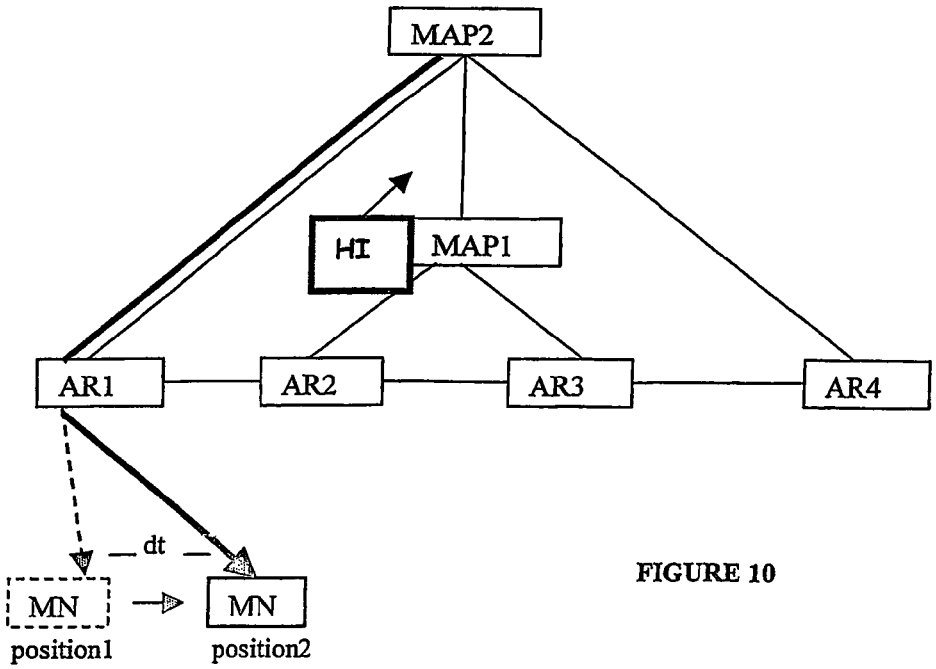
Figure 11:
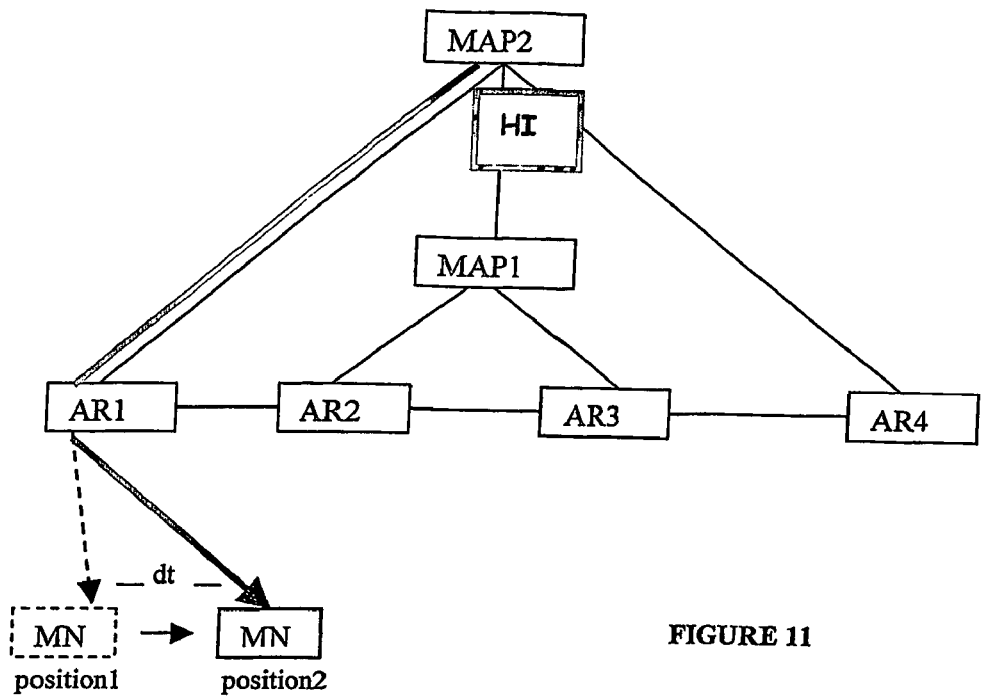

The MN continues being serviced by AR1 for time (dt) as shown in FIG. 10. At the same time the Handover Initiation message travels from MAP1 to MAP2 (see FIG. 11), which according to the invention is provided with a timer. It is important to note that the HI message that reaches MAP2 contains the actual service time (dt) that was agreed between AR1 and AR2 during step 4a. The specified interval (dt) can be adjusted accordingly by the MAP2 to take into account any additional delays imposed by the wired and the wireless links (transmission delays).

Step 5

Figure 12:
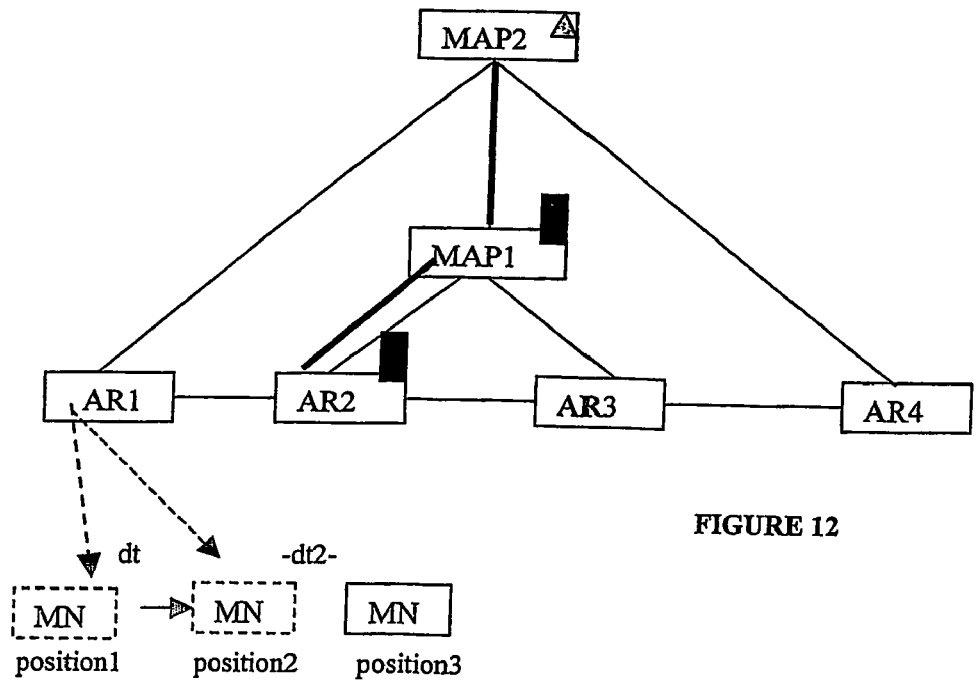

MN starts to perform L2 handover without any need to inform AR1. This happens after the elapse of time dt. In normal anticipated handover procedures the MN informs the AR1 when Layer 2 handover is about to take place by sending a Fast Binding Update signal to AR1. In our proposal F-BU transmission is not required. As FIG. 12 shows, the MN performs Layer 2 handover over a period of dt2, during which time the MN cannot receive any data packets.

At the same time, once time (dt) has expired, the mobile anchor point 2 (i.e the MAP having both the AR1 and AR2 in its domain) is triggered and starts re-directing packets to MAP1.

The MAP2 timer plays a critical role in the re-routing of data packets between MAPs. The timer is based on the agreed time (dt) that was passed to MAP2 via the reception of the Handover Initiation message with adjustments for the delays imposed by the wired link that connects AR2, MAP1 and MAP2 together and the wireless link between the Access Point and the Mobile Node. The re-routing takes place once MAP2 timer expires.

Packets received by MAP1 are decapsulated and encapsulated once again and are sent to AR2 by the MAP1. Packets are cached (buffered) in Access Router 2 and/or MAP1 ready to be sent to the MN once it has signalled successful L2 handover to AR2. The solid areas and the triangular symbol within MAP2 indicate possible buffering and the 'timer' respectively. This stage can be regarded as partial anticipated handover.

The invention does not rely on tunnelling between the involved Access Routers, as is the case in normal anticipated procedures.

Step 6

Figure 13:
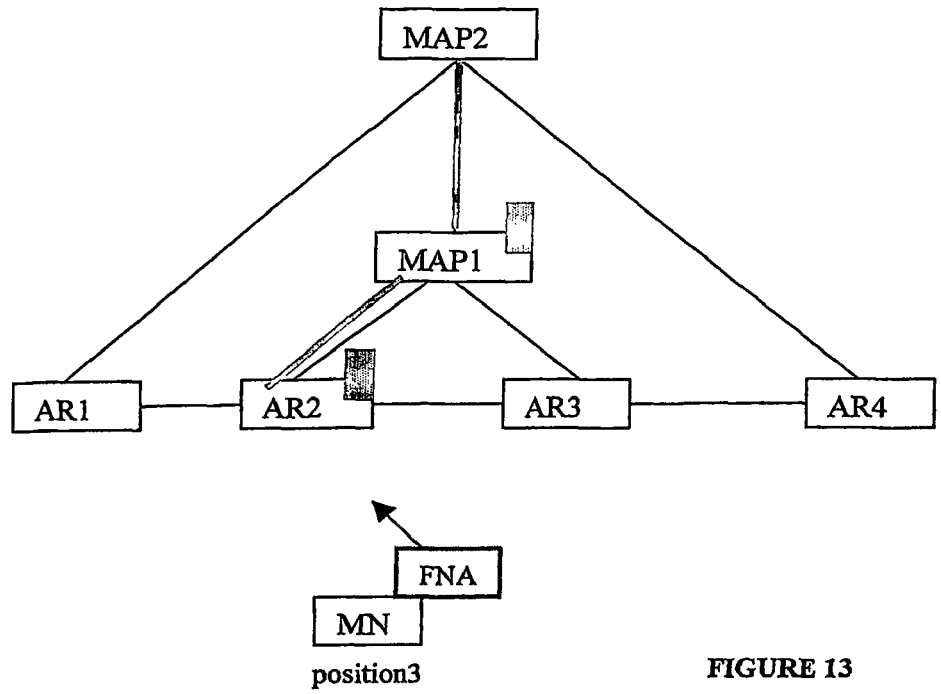
Figure 14:
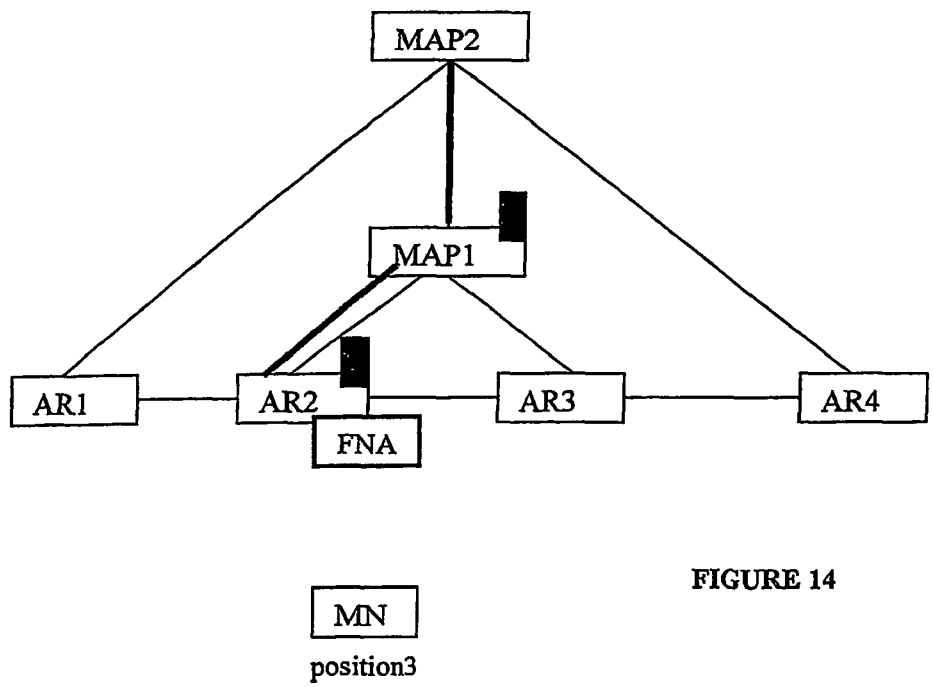
Figure 15:
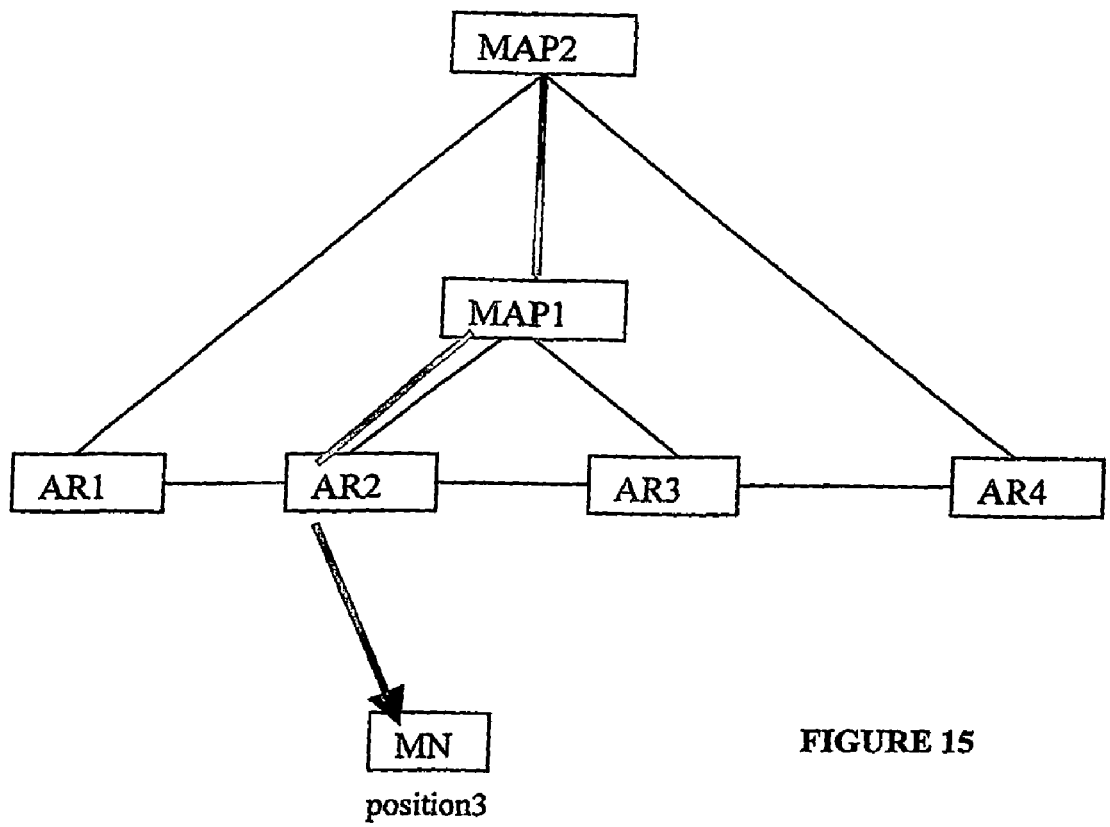

As shown in FIG. 13, once layer 2 handover has finished, the MN sends a Fast Neighbour Advertisement (F-NA) to Access Router 2 indicating that the MN has arrived. The Fast Neighbour Advertisement contains the link layer address of the MN in order to be recognised by AR2. Once the Access Router 2 has received the F-NA (FIG. 14) it can start delivering buffered packets to the MN as shown in FIG. 15.

Binding update transmissions do not need to be sent from MN to AR2 and then to MAP1 informing MAP1 that layer 3 handover will take place (as is the case in standard anticipated and hierarchical handover procedures) since MAP2 and MAP1 are already aware of the new subnet prefix that needs to be used and the data packets have already being re-directed from MAP2 to MAP1 (i.e Layer 3 handover has been achieved already).

It is important that Step 5 is completed before the Mobile Node completes the layer 2 handover and decides to send the F-NA as a trigger mechanism to inform Access Router 2 of its arrival. Otherwise, there will be a delay when the Mobile Node has arrived at Access Router 2 with no packets ready for it to receive.

As a result, certain decisions need to be made as follows:

for how long data needs to be buffered in AR2 (and in MAP1 if required)

when the re-routing mechanism, that will redirect packets to MN from the route MAP2 to AR1 to the route MAP2 to MAP1, should start taking place in order to guarantee that data packets will already be buffered at AR2 and waiting to be delivered to MN once layer 2 handover has been completed (As presented above, the "switching" process begins once Step 5 has been completed. It might be required to delay the re-routing process for example if the Mobile Node is moving too slowly.)

the size of the buffer needed to compensate for the likelihood of a Mobile Node moving too slowly.

The foregoing presents an alternative method of performing fast handovers. The method takes advantage of the extra degree of localisation that can be achieved by employing more than one mobile anchor point and also introduces the concept of "partial anticipated" handover without any tunnelling between the involved Access Routers. An examplary configuration of the method is shown in FIG. 2 where a re-routing mechanism is implemented in the upper MAP. In this example data packets are re-directed ("switched") once the timer within the mobile anchor point, which is at the top of the hierarchy for this particular configuration, expires. The timer within the aforementioned Mobile Anchor Point takes into account any signalling delays imposed by intervening wired and wireless links and starts running once a "trigger" from the lower mobile anchor point is received. The re-directed packets can subsequently be buffered totally in AR2 or the buffering load may be split between the involved Access Routers and mobile anchor points (i.e. between AR2 and MAP1 in this example). The size of the buffer needs to be adjusted according to the speed of the Mobile Node.

It is a feature of the method that Binding Update (BU) transmissions are not needed for the re-direction of data packets since the involved mobile anchor point entities are already informed of the new subnet prefix (that is indicated in the proposed new CoA) that needs to be adopted. The data packets will have already been re-directed once the Mobile Node has reached the new Point of Attachment. (i.e, AR2).

A further feature is that Layer 2 handover starts once the agreed time period (dt) has expired. This means that no Fast Binding Update (F-BU) transmissions need to be sent to the old Point of Attachment (i.e, AR1) prior to Layer 2 handover, as is the case in standard anticipated handover procedures.

What is claimed is:

1. A method for routing of data among a mobile node and first and second communications nodes in a hierarchical mobility management system having tiered mobile anchor points, the method comprising the steps of:
 a) receiving, at the first communications node a handover initiation signal to initiate handover of the mobile node from the first communications node to the second communications node;
 b) determining an expiry period based on a remaining time of attachment of the mobile node to the first communications node including:
  b1) sending, by the second communications node, a desired expiry period; and
  b2) responsive to the desired expiry period, sending, by the first communications node, a final expiry period, dt, that the first communications node is willing to continue direct connection to the mobile node; and
 c) switching a data routing operation from the first communications node to a second communications node,
 wherein step (c) is regulated, by a controlling mobile anchor point having the first and second communications nodes in its domain, to occur synchronously with a passing of the final expiry period dt.

2. A method according to claim 1, wherein step (b2) determines the final expiry period based on the remaining time of attachment as well as an estimated transmission delay as at least a portion of the estimated delay time.

3. A method according to claim 1 or 2 wherein steps (b1) and (b2) are performed as part of an exchange of handover initiation and acknowledgement signals between the first and second communications nodes.

4. A method according to claim 1 or 2, wherein the controlling mobile anchor point is a lowest tier mobile anchor point in the hierarchical mobility management system including both the first and second communications nodes.

5. A method according to claim 1 or 2, further comprising the step of buffering data along a signal path from the controlling mobile anchor point through the second communications node when routing of data is switched from the first to the second communications node.

6. A method according to claim 1 or 2, further comprising the step of introducing one or more predetermined synchronization time delays between steps (a) to (c).

7. A method according to claim 1 or 2, wherein the handover initiation signal is a fast binding update signal from the mobile node to the first communications node.

8. A method according to claim 1 or 2, further comprising the step of sending the handover initiation signal from the mobile node, wherein the handover initiation signal is a Neighborhood Advertisement and step (a) receives the Neighborhood Advertisement at the second communications node.

9. A method according to claim 1 or 2, wherein the first and second communications nodes function as access routers.

10. A method according to claim 2, further comprising the step of determining the estimated transmission delay.

11. A system for routing data among a mobile node and first and second communications nodes within hierarchical mobility management systems having tiered mobile anchor points, said system comprising:
 a controlling mobile anchor point having the first and second communications nodes in its domain, said controlling mobile anchor point configured for regulating the routing of data to switch routing of data from the first to the second communications nodes synchronously with the expiry of a predetermined period following a receipt of a handover initiating signal, said determined period relating to remaining time of attachment of the mobile node to the first communications node that is an expiry period used for starting redirection of packets to the second communications node and an estimated delay time,
 the second communications node configured for sending a desired expiry period to the first communications node and
 the first communications node configured for sending, in response to the desired expiry period, a final expiry period, corresponding to the predetermined period, that the first communications node continues direct connection to the mobile node.

12. The system as claimed in claim 11 wherein said estimated delay time is related to an estimated transmission delay in the domain.

13. The system as claimed in claim 11 wherein said first and second communications nodes are arranged to exchange handover initiation signals and acknowledgement signals with each other, part of said exchanged signals being relevant for proposing and agreeing on said remaining time of attachment of the first communications node.

14. The system as claimed in claim 11 wherein said controlling mobile anchor point is arranged to be the lowest level mobile anchor point in the hierarchy of said mobility management systems.

15. The system as claimed in claim 11 wherein said switching of routing data from first to second communications nodes by the controlling mobile anchor point is arranged to trigger implementation of buffering along a signal path from said controlling mobile anchor point through the second communications node.

16. The system as claimed in claim 11 wherein synchronization is achieved in the system by introducing one or more predetermined time delays between the execution of consecutive steps.

17. The system as claimed in claim 11 wherein said first and second communications nodes are access routers.

18. A mobile node for use in a system as claimed in claim 11, said mobile node adapted to send a fast binding update signal as a handover initiation signal to the first communications node.

19. A mobile node for use in a system as claimed in claim 11, said mobile node adapted to send a neighborhood advertisement as an initiation signal to the second communications node.

* * * * *